United States Patent [19]
Laabs et al.

[11] Patent Number: 5,749,526
[45] Date of Patent: May 12, 1998

[54] CENTRALLY INSTALLED CLEANING/ WASHING SYSTEM FOR BUILDINGS

[75] Inventors: Gary R. Laabs, 2155 James Ave., Britt, Iowa 50423; Donald R. Anderson, Britt, Iowa

[73] Assignee: Gary R. Laabs, Britt, Iowa

[21] Appl. No.: 519,754

[22] Filed: Aug. 28, 1995

[51] Int. Cl.$^6$ ................................. B05B 15/00
[52] U.S. Cl. ............... 239/307; 239/532; 251/351; 251/253; 137/360; 134/123
[58] Field of Search .............. 239/67, 307, 532; 137/360; 251/253, 254, 363, 351; 134/57 R, 123

[56] References Cited

U.S. PATENT DOCUMENTS

| | | |
|---|---|---|
| 274,133 | 3/1883 | Meady . |
| 3,200,839 | 8/1965 | Gallagher . |
| 3,322,350 | 5/1967 | Heinicke et al. ............ 239/307 X |
| 3,424,189 | 1/1969 | Woodford . |
| 3,438,580 | 4/1969 | Siebring ............... 134/123 X |
| 3,494,373 | 2/1970 | Horak et al. ............ 137/360 X |
| 3,543,787 | 12/1970 | Tepper . |
| 3,662,950 | 5/1972 | McIntosh et al. . |
| 4,022,243 | 5/1977 | Edwards . |
| 4,178,956 | 12/1979 | Fillman . |
| 4,182,356 | 1/1980 | Woodford, Sr. . |
| 4,313,828 | 2/1982 | Brownlee . |
| 4,566,723 | 1/1986 | Schulze et al. . |
| 4,821,762 | 4/1989 | Breneman ............... 137/360 X |
| 4,844,116 | 7/1989 | Buehler et al. . |
| 4,848,384 | 7/1989 | Christopher et al. ......... 134/123 X |
| 4,850,536 | 7/1989 | Teranishi et al. . |
| 5,029,607 | 7/1991 | Blazek et al. . |
| 5,060,825 | 10/1991 | Palmer et al. . |
| 5,074,438 | 12/1991 | Ingram . |
| 5,123,447 | 6/1992 | Calvin et al. . |
| 5,135,174 | 8/1992 | Chaplinsky . |
| 5,158,105 | 10/1992 | Conway . |
| 5,230,471 | 7/1993 | Berfield . |
| 5,279,448 | 1/1994 | Hanlin et al. . |
| 5,333,785 | 8/1994 | Dodds et al. ............ 239/67 X |
| 5,383,605 | 1/1995 | Teague ................ 134/123 X |
| 5,392,805 | 2/1995 | Chrysler . |
| 5,533,671 | 7/1996 | Baer ................... 239/67 X |

OTHER PUBLICATIONS

SMT™ Spray Master Technology® Clean Up At The . . . "Touch–of–a–Button" World Class Washdown Systems and Accesories; Jan. 1997.

Primary Examiner—Andres Kashnikow
Assistant Examiner—Steven J. Ganey
Attorney, Agent, or Firm—Henderson & Sturm

[57] ABSTRACT

A cleaning system which is centrally and permanently installed in homes or commercial buildings and is connected to the water line therein. The system includes a pump operably attached to the water line and one or more freeze-proof valves are connected to the outside wall of the building or to an adjoining building. A fluid conduit is operably attached to the pump outlet and at the other end to the inlet of the freeze-proof valve. A spray wand, including an outlet nozzle, is attached to the freeze-proof valve on the outside of the building or buildings and includes structure for easily connecting or disconnecting such spray wand so that it can be removed when not in use and used at any one of the freeze-proof valve outlets. One or more chemical solutions can be selectively introduced into the fluid passing through the high pressure line. A wireless remote control is provided for permitting selections of the chemicals to be used at any one time and also to select the water temperature, or any combination of the above.

11 Claims, 7 Drawing Sheets

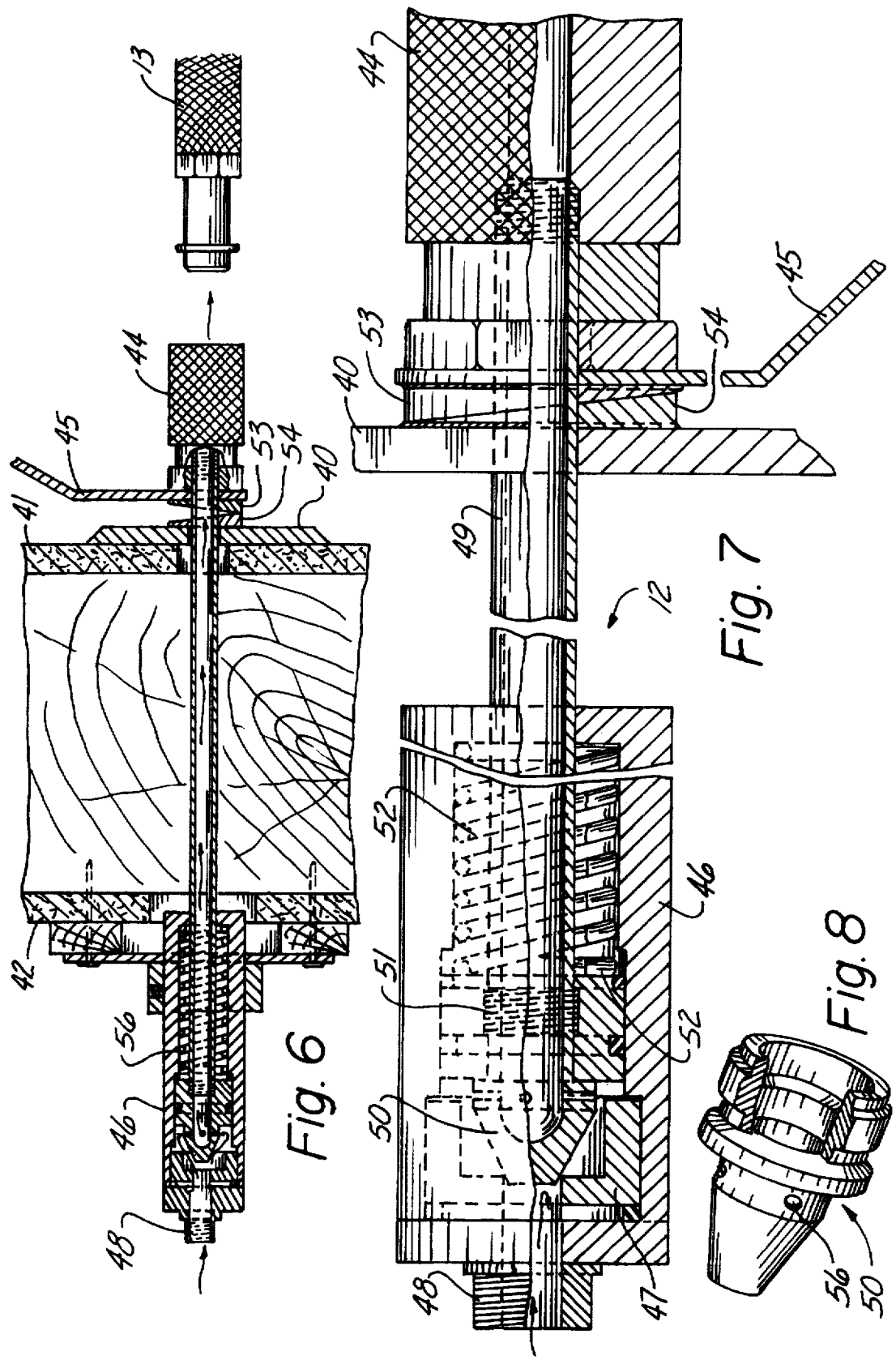

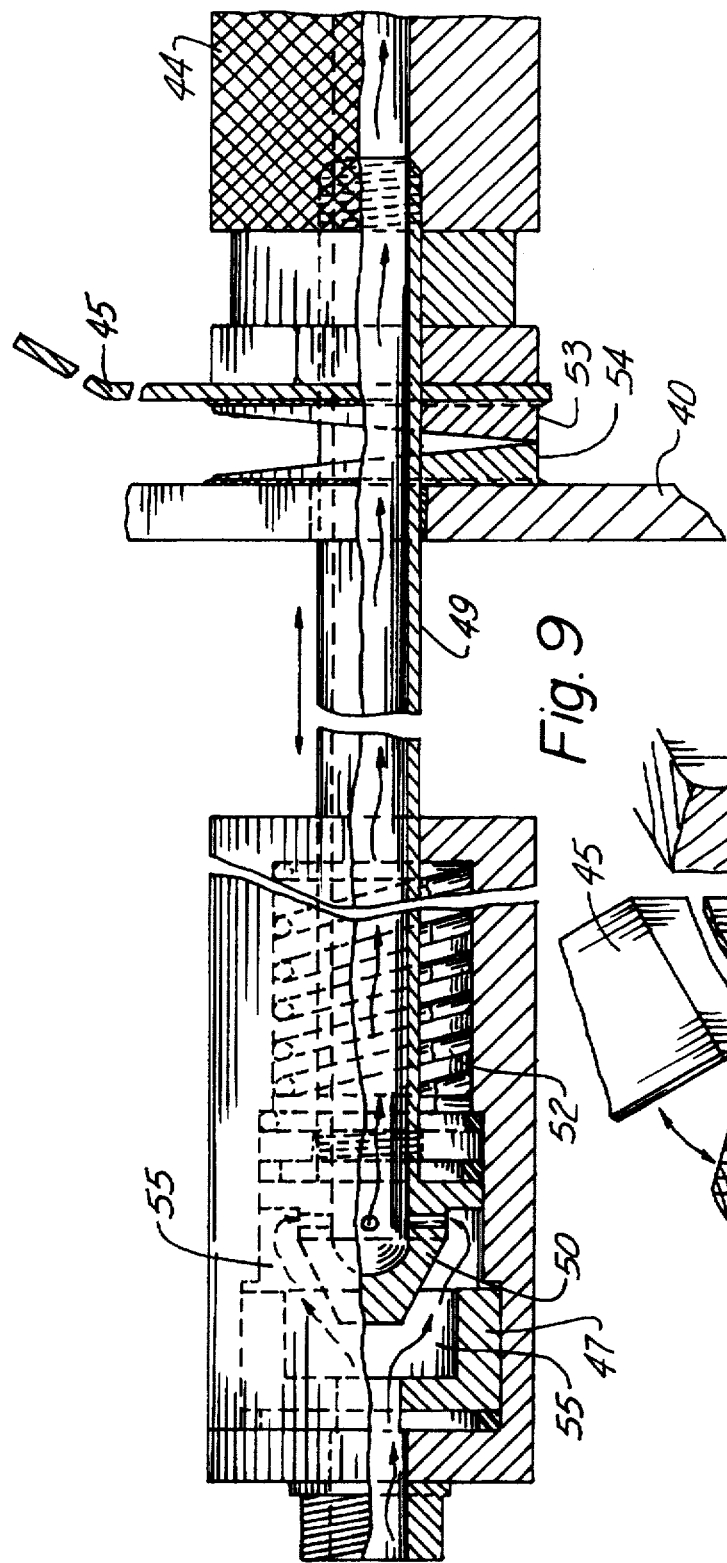

5,749,526

1

CENTRALLY INSTALLED CLEANING/WASHING SYSTEM FOR BUILDINGS

TECHNICAL FIELD

The present invention relates generally to a cleaning system intended to be centrally, and permanently installed in homes or commercial buildings. It can be furnished through contractors or installers as an integrated package, including all specialized parts such as a remote control and a freeze-proof valve.

BACKGROUND ART

Coin operated washing stations have been used for decades to permit a person to wash cars, trucks and other vehicles by first driving such vehicle into the stall, inserting money and selecting various options such as a high-pressure wash with soap and a rinse cycle to name but two of many options. Because of the inconvenience of waiting in line and going to a specific place to do such washing, a market has developed for portable washing and cleaning structures for use at home, on the farm, and in commercial settings where not only vehicles but other things such as farm implements or over-the-road semi-trailer trucks need to be cleaned and washed.

These portable cleaners/washers are typically stored in a garage or other place where they take up space and require some effort to hook up and prepare for use.

Consequently, there has developed a need for a better system for using such a cleaning and washing apparatus.

U.S. Pat. No. 5,279,448 to Hanlin et al. address such problem by disclosing an installable and centralized self-contained appliance-like fluid dispensing system for cleaning and washing. One of the major drawbacks with this system is that the controls are hard-wired and therefore are quite inconvenient and cumbersome to install and use.

DISCLOSURE OF THE INVENTION

The present invention relates generally to a cleaning system which is centrally and permanently installed in homes or commercial buildings and is connected to the water line therein. The system includes a pump operably attached to the water line and to one or more freeze-proof valves connected to the outside wall of the building or to an adjoining building. A fluid conduit is operably attached to the pump outlet and at the other end to the inlet of a freeze-proof valve. A spray wand, including an outlet nozzle, is attached to the freeze-proof valve on the outside of the building or buildings and includes structure for easily connecting or disconnecting such spray wand so that it can be removed when not in use and used at any one of the freeze-proof valve outlets. One or more chemical solutions can be selectively introduced into the fluid passing through the high pressure line. A wireless remote control is provided for permitting selections of the chemicals to be used at any one time and also to select the water temperature, or any combination of the above.

An object of the present invention is to provide an improved washing/cleaning systems for installation into homes or commercial buildings.

Another object of the present invention is to provide a centrally and permanently installed cleaning system in homes which is controlled by a wireless remote control.

A further object of the present invention is to provide such a system which has more than one outlet so that an attachable spray wand can be attached to any one of several outlets.

2

A still further object of the present invention is to provide a freeze-proof valve for attachment to the outside wall of a building in conjunction with the aforementioned system.

A still further object of the present invention is to provide such a washing/cleaning system for a building which can also extend underground to other buildings and be remotely controlled from such other buildings from either inside or outside of such other buildings.

Other objects, advantages, and novel features of the present invention will become apparent from the following detailed description of the invention when considered in conjunction with the accompanying drawings.

BRIEF DESCRIPTION OF THE DRAWINGS

FIG. 6 is a cross-sectional view taken along line 6—6 of FIG. 4;

FIG. 7 is an enlarged partial cross sectional view similar to FIG. 6, but showing the valve in a closed position, rather than the open position shown in FIG. 6;

FIG. 8 is an enlarged perspective view of the valve head and piston with a portion thereof broken away to show the inside thereof;

FIG. 9 is a view like FIG. 7, but showing the valve in the open position having been manually opened as shown by the valve handle being straight up;

FIG. 10 is a perspective broken away view of the handle camming mechanism of the freeze-proof valve of FIGS. 4–7.

BEST MODE FOR CARRYING OUT THE INVENTION

Figure 1:
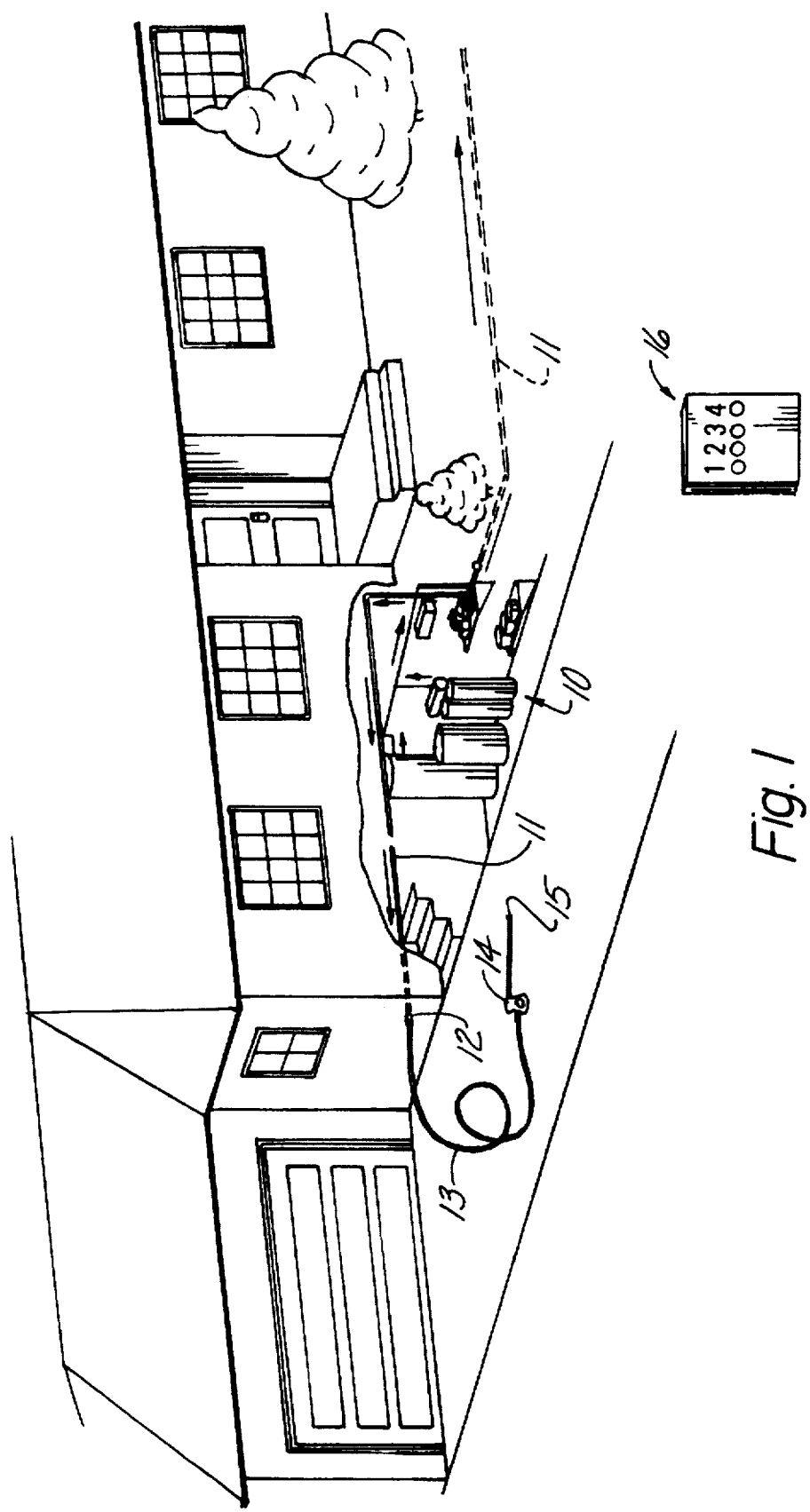
FIG. 1 is a perspective view of a home having the present invention installed therein and having a portion of the home broken away to show how such system is installed in the basement of the home.

Referring now to the drawings wherein like reference numerals designate identical or corresponding parts throughout the several views, FIG. 1 shows a house having a centrally installed cleaning/washing system (10) constructed in accordance with the present invention. The system (10) shown in FIG. 1 includes one or more permanently installed outlet lines (11) which lead to a freeze-proof valve (12) on the outside wall of a building or the like. A hose (13) is attached by a quick-connect coupler to a wand (14) having a nozzle (15) thereon for spraying, washing, cleaning and rinsing vehicles or the like. A remote control (16) is preferably of a radio frequency type which communicates with the apparatus (10) to select various cleaning options from a position outside of the home, for example, adjacent the cleaning wand (14).

The system utilizes a cleaning power unit permanently plumbed into the house with discharge lines (11) reaching out to one or more service connections at the exterior wall of the building or run underground to out buildings.

Figure 2:
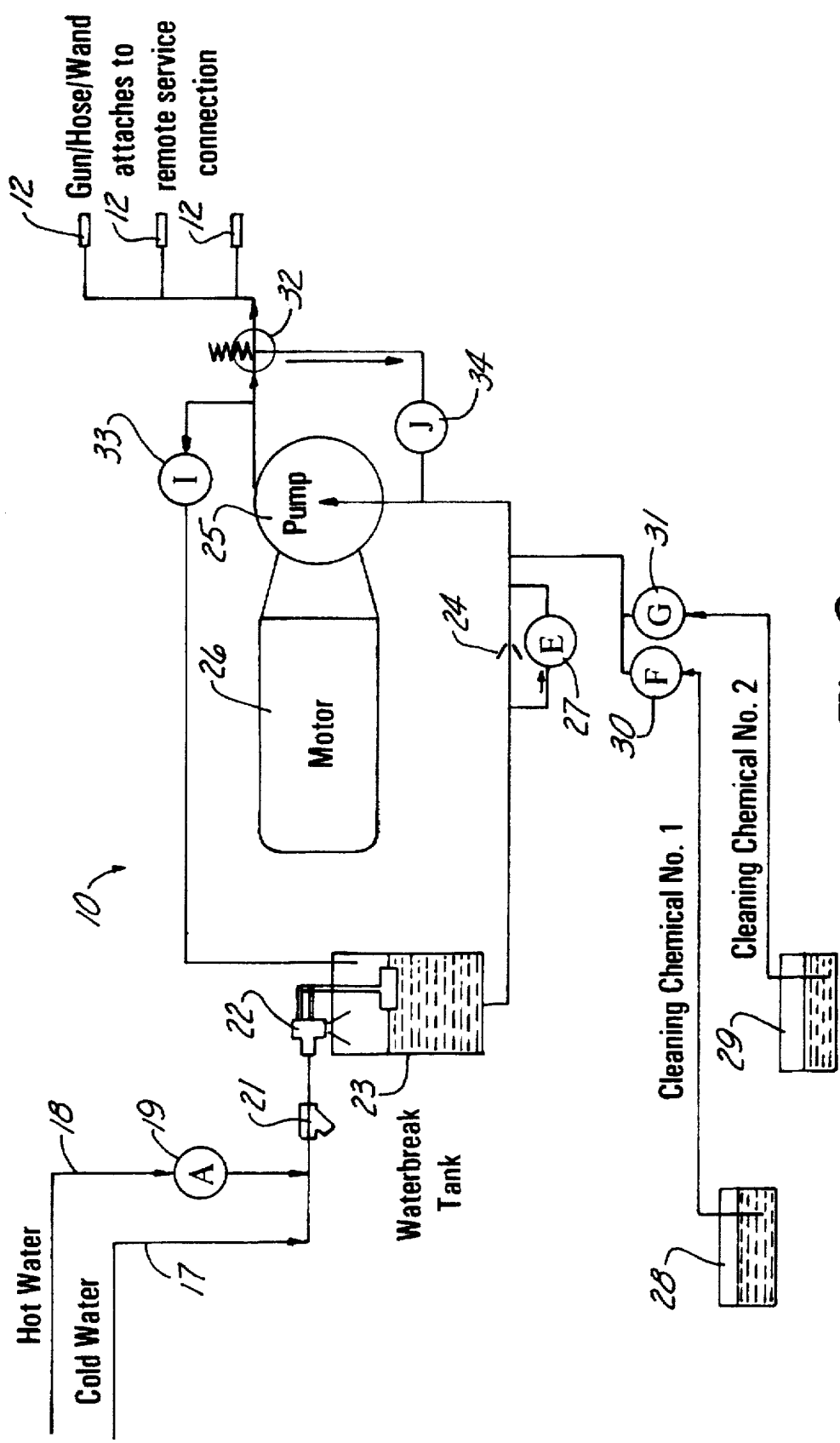
FIG. 2 is a schematic view of the cleaning/washing system of the present invention.

Incoming water through cold water line (17) or hot water line (18) of FIG. 2 are connected to the system. A warm water solenoid valve (19) controls the flow of hot water to the system. When this valve (19) is closed, the unit is supplied with cold water. When it is open, it allows hot water to blend with cold water.

Another option (not shown) would be to supply cold/hard water in line (17) and hot/soft water in line (18) to yield warm semi-soft water to the system (10). A still different option (not shown) would be to supply any combination of pure cold/warm and/or hard/soft water, but such option would require extensive manifolding of water lines.

A water inlet filter (21) in FIG. 2 is provided to remove sand or other impurities that may enter the system from the water supply. In the same line with water inlet filter is a water break valve (22). The water break valve (22) is a float valve which introduces water into a tank (23) and maintains a level at a given distance below the actual outlet of this valve (22). This distance is known as a "water break" and it makes it impossible for the system to allow any contaminated water to enter the water supply system in case of failure.

A flow orifice (24) is provided because the pump (25) is of a fixed displacement design and it always attempts to pump the same volume of water. By restricting the flow of water going to the pump, a slight negative pressure can be created in the suction of the pump. This negative pressure allows cleaning chemicals to be pulled into the system and applied at high pressure after passing through the pump. The motor (26) is a totally enclosed fan cooled (TEFC) or open drip-proof design operating at a voltage of 115 vac or 220 vac. The pump (25) is preferably of a type having the liquid which passes through a close coupled three plunger pump with oil bath crank case and with a capacity of 2.5 GPM to 3 GPM at 1,000–1,500 PSI. Other combinations of GPM and PSI are also possible.

A valve (27) is provided as shown in FIG. 2. This valve (27) is located in parallel with the flow orifice (24). When in the rinse position (open) there is no restriction in flow to the pump and no chemical is pulled into the pump (25). When in the soap position (closed) the chemicals from containers (28) and (29) can be pulled into the system by the slight vacuum generated by the orifice (24) in the suction line to the pump (25).

Valves (30) and (31) control the flow of cleaning chemical from containers (28) and (29), respectively into the system. The circuitry of FIG. 3 allows only one of these valves to be opened at a time. When the system calls for a chemical, either valve (30) or (31) is opened to allow the flow of cleaning chemical into the system.

A high pressure relief valve (32) is provided so that high pressure water will pass through this pressure sensing relief valve (32). When the spray gun (14) is closed, this valve will open and allow water flow to recirculate through the pump (25) until the gun (14) is re-opened. While the water is recirculating, the pressure is trapped in the hose (13) at full pressure and the water circulating through the pump (25) is at a very low pressure. During this recirculation, there is some heat built up in the pump (25). A safety relief valve (33) is also provided to relieve pressure in the pump circuit if the pressure relief valve (32) fails to function.

A high temperature shut-down switch (34) is provided as in the bypass line. Due to friction within the pressure relief valve, recirculating water will get hot enough, in time, to damage the internal parts of the pump (25), unless controlled. So before this damage occurs, switch (34) will shut the pump (25) down if the temperature rises above a pre-determined amount. The switch (34) energizes a red indicator light when it shuts off the motor (25). The system will re-start after a short delay when cooling occurs in the bypass line.

Freeze-proof valves (12) are shown schematically in FIG. 2. The pump (25) will supply high pressure water to these freeze-proof valves (12) at multiple remote locations. The gun (14) may be engaged in whichever outlet or freeze-proof valve (12) that is desired.

Figure 3:
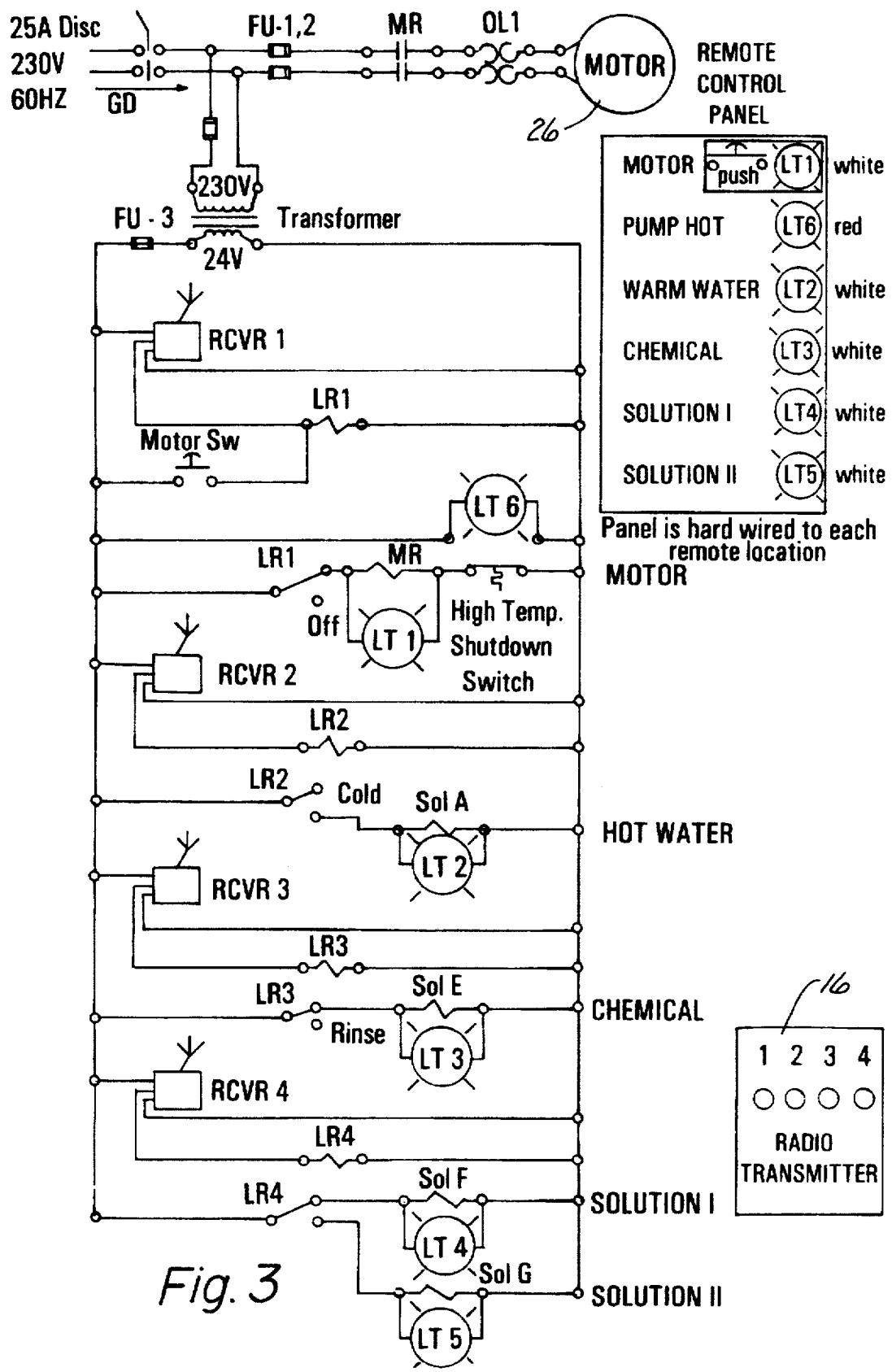
FIG. 3 is a schematic of the electrical system of the present invention.

Referring now to FIG. 3, it is noted that the motor (26) is hardwired into the electrical circuit of the home or building. Line voltage reaches the motor through contacts in the motor starter. The contacts are controlled by a coil that is energized by 24 vac power in a control circuit. Line voltage is reduced to 24 vac through a control transformer.

There are several latching relays in the control circuits of the machine. The relay has contacts that are normally open and those that are normally closed. Each relay has a 24 vac coil that strokes the relay when energized. When the relay is stroked, it latches into position and stays in that position until stroked again. In this application, the latching relay can be used to alternate between two different devices (chemical solution 1 and chemical solution 2 as shown in FIG. 2), or it can be used to provide On/Off signals (soap/rinse). Only momentary signals are required to stroke the relay from one position to the other.

The radio receiver receives the control signal, and activates the switch that, in turn, activates the latching relay. Four different receivers are used in FIG. 3 and each is coded to receive a different signal. The operator can control functions in the system by sending a signal from the transmitter or remote control (16). The range of these devices is typically from 150 to 200 feet. Indicator lights are 24 vac lights to give an indication to the operator of which functions are in operation. These lights are hard wired from the main panel to remote sites as is necessary. Push-button switches can also energize the latching relays.

Figure 4:
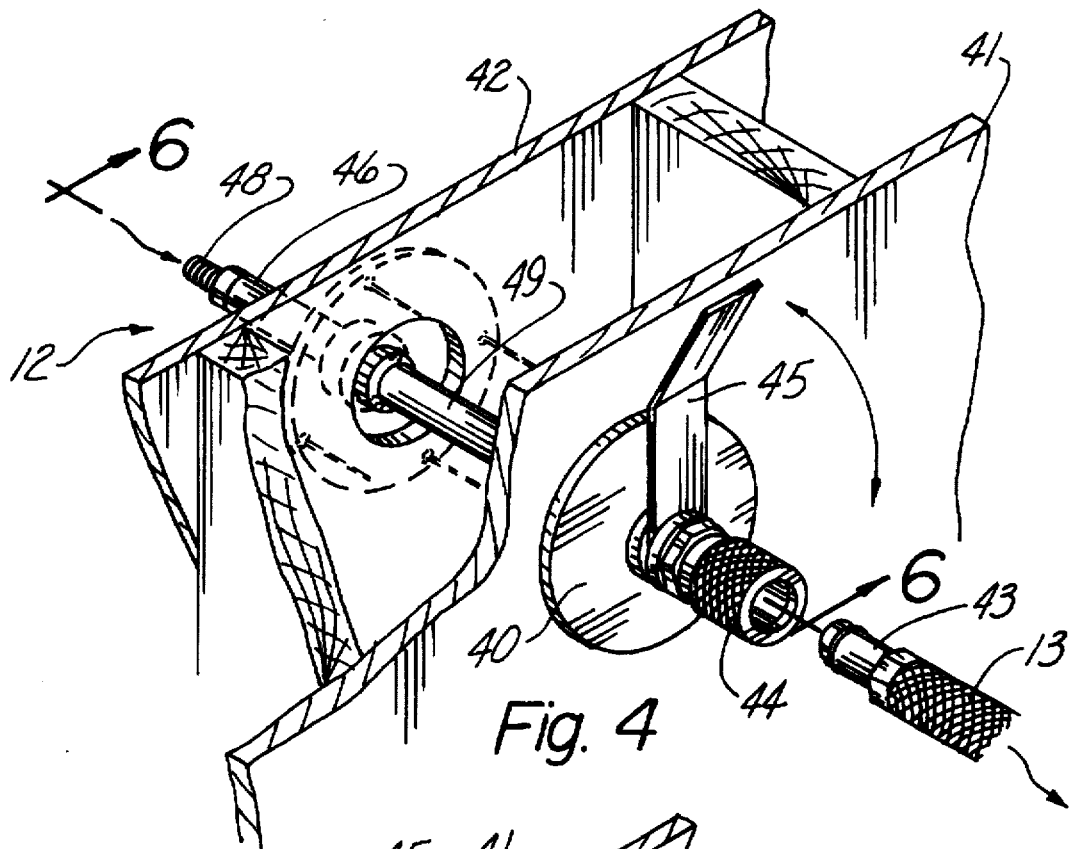
FIG. 4 is a perspective broken away view from outside of one of the outside walls of the home of FIG. 1, showing a freeze-proof valve and a quick disconnect coupling for the detachable gun, hose and spray wand.
Figure 5:
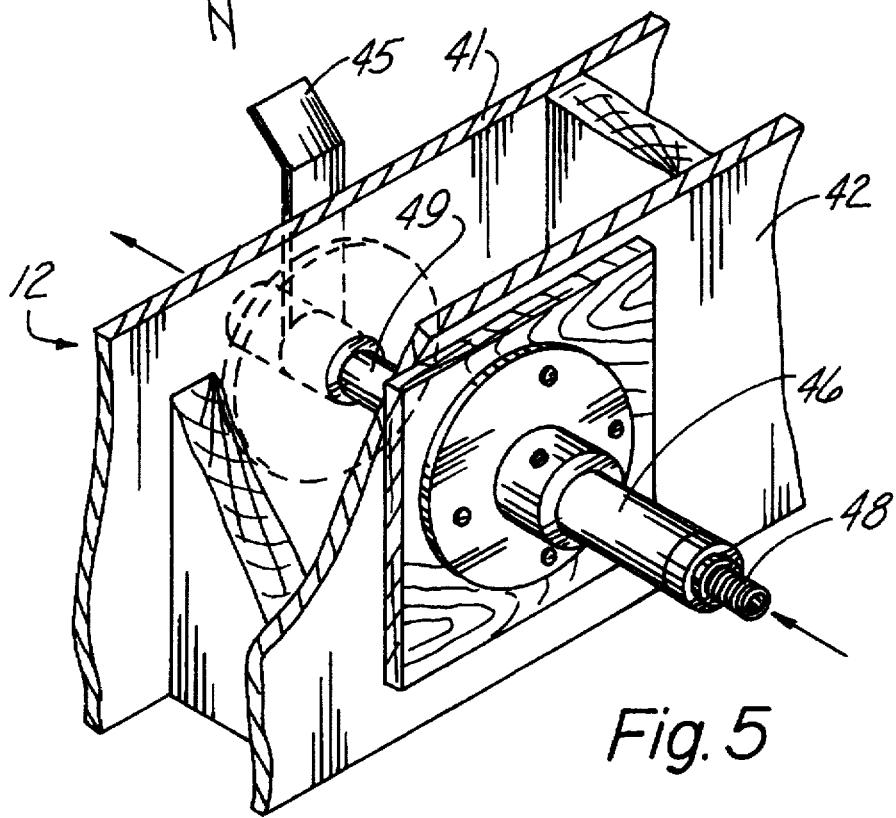
FIG. 5 is a perspective view of the freeze-proof valve from the inside of such home.

Referring now to the freeze-proof valve of FIGS. 4–11, an outside wall (41) of the house of FIG. 1 is shown in FIG. 4, along with an inside wall (42). The hose (13) has a male portion of a quick disconnect coupler (43) thereon and the other portion of the quick disconnect coupler (44) is permanently attached to the outlet of the freeze-proof valve (12). FIG. 5 shows the freeze-proof valve from the inside of the building, the handle (45) being shown on the outside of the house. Typically there is insulation between the inside and outside panels (41) and (42), but it has been omitted for the convenience of showing this freeze-proof valve.

Referring to FIGS. 7 and 8, it is noted that a valve body (46) has a valve seat (47) therein, downstream from inlet (48). Outlet pipe (49) is a conduit which leads to and is connected to the inside of piston (50) and is sealed thereto by pipe threads (51). The piston and outlet conduit (49) are attached so that they both move together. A compression spring (52) biases the piston or valve head (50) to a closed position as shown in FIG. 7. The valve head (50) at such time will prevent flow to the outlet (49) because the pressure on the upstream side is insufficient to push the small area exposed to pressure on the piston (50) to the right, i.e., it cannot be sufficient to overcome the pressure of the spring (52). When it is desired to open the valve (50), first the hose (13) is connected to the outlet pipe (49). Referring again to FIG. 7 where the valve plunger (50) is closed, it is noted that the handle (45) is in the downward position and the relative position of camming members (53) and (54) should be noted. To use the sprayer wand (14), the handle (45) is rotated from the lower position to the upper position shown in FIG. 6. Due to the configuration of the cams (53) and (54), this will cause the outlet conduit (49) to move to the right with respect to the housing (46) and outer wall (41) and the valve will be opened to the position shown in FIGS. 6 and 9.

Figure 11:
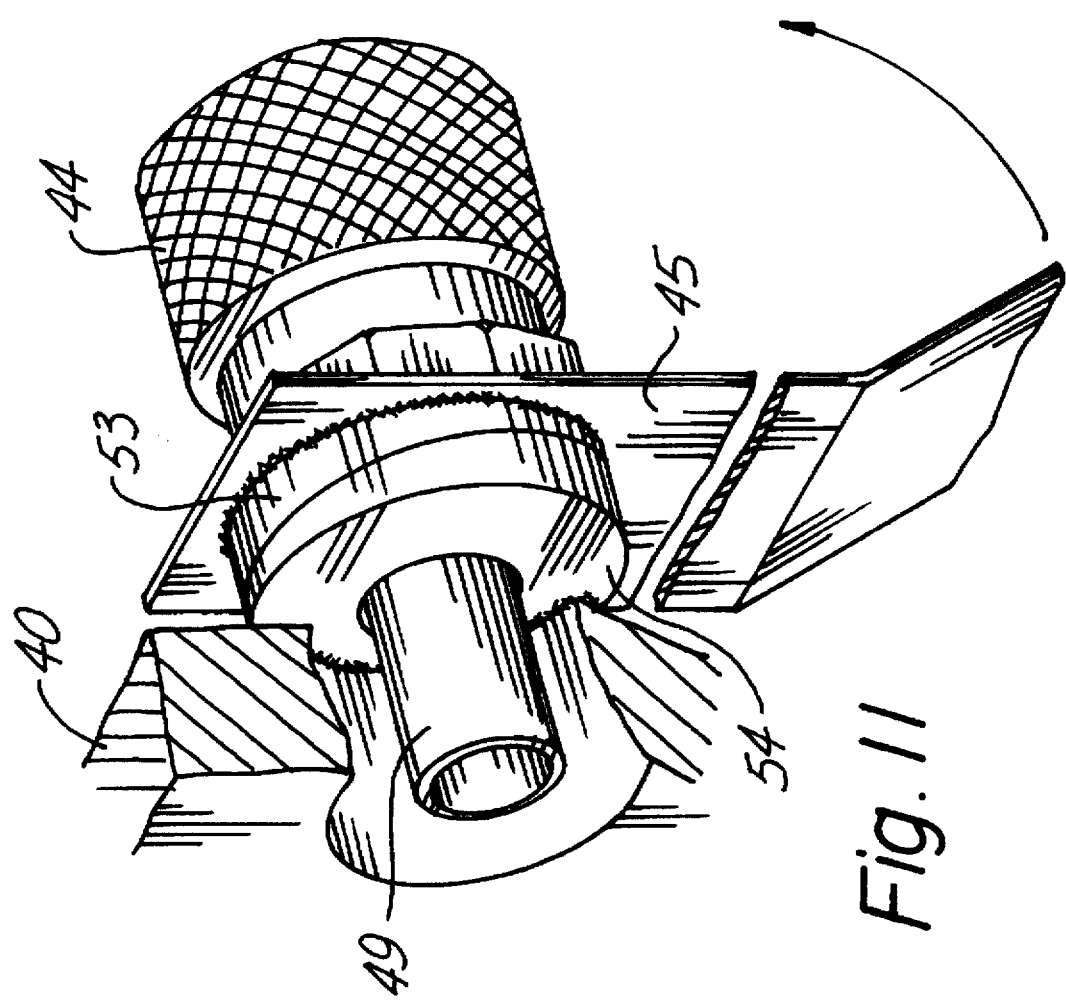
FIG. 11 is a perspective view of the camming mechanism with the handle in the off position.

In FIG. 6, the hose (13) is disconnected so that low pressure flow would come out of the coupler end (44). The handle (45) will remain raised due to frictional forces. If the hose (13) is connected by coupler (43) and (44), the pressure in chamber (55) will push the outlet conduit (49) a little bit more to the right as viewed in FIG. 6 and the weight of gravity will allow the handle (45) to move to the downward position, for example, as shown in FIG. 11. Referring again to FIG. 9, it is noted that as long as the pump (25) is supplying high pressure to the chamber (55), and as long as the hose (13), wand (14) and nozzle (15) are properly functioning, there will be a high pressure in chamber (55) which will push against the entire left side of the piston or plunger (50), as shown in FIG. 9, and this will hold the valve head or plunger (50) to the position shown in FIG. 9. This allows flow through openings (56) which lead to the hollow center of the plunger (50) and ultimately to the inside of outlet conduit (49). This, in turn, leads to the hose (13), wand (14) and nozzle (15).

To close the valve (50), the handle (45) can be turned back to the position shown in FIG. 7 and the motor (26) can be turned off to stop the pump (25). If for any reason the hose (13) becomes disconnected, or if hose (13), wand (14) or nozzle (15) would malfunction or break causing the high pressure to be released therefrom, the valve plunger (50) will automatically move back to the closed position shown in FIG. 7.

In operation, the hose (13) and wand (14) would first be connected to one of the outlets or freeze-proof valves (12). The remote control (16) would then be utilized to start the motor (26) to operate the pump (25). The remote control can then be used to select the temperature of the water by activating the solenoid valve (19) if desired. The remote control also can actuate valves (30) and (31) to provide either cleaning chemical 1 or cleaning chemical 2.

FIG. 3 shows the remote control panel on the top right portion thereof and this illustrates the options in this embodiment of the invention. It is to be understood, however, that other options could easily be added or subtracted from this list and still be within that which is contemplated by this invention. The valve handle (45) would be open and the wand (14) could be used to clean a vehicle or whatever else is desired to be cleaned. When it is desired to switch from one cleaning or washing option to another, the remote control would be utilized. When it is desired to shut down the system, the remote control would be used to shut off the motor (25) and pump (26) and the valve handle (45) would be turned back down to the closed position, at which time the hose (13) and wand (14) could be stored away in preparation for their next use.

Obviously many modifications and variations of the present invention are possible in light of the above teachings. It is therefore to be understood that, within the scope of the appended claims, the invention may be practiced otherwise than as specifically described.

We claim:

1. Apparatus comprising:

an enclosed building having outside walls;

a water line substantially permanently installed and plumbed inside said building for supplying water at a pressure in a first pressure range;

a pump substantially permanently installed and plumbed inside said building said pump having an inlet operably attached to said water line and an outlet for delivering water at a pressure higher than that of the pressure of said first pressure range through a fluid line substantially permanently installed and plumbed for passing fluid at a higher pressure than the pressure in the first pressure range, a valve connected to one of said outside walls, said valve having an inlet port and an outlet port;

a fluid conduit substantially permanently installed and plumbed inside said building operably attached at one end thereof to said pump outlet and at the other end thereof to the inlet port of said valve;

a spray wand outside said building, said spray wand including an outlet nozzle;

means for selectively, operatively connecting or disconnecting said spray wand to said outlet port of the valve;

means for operably introducing a cleaning chemical into fluid passing through said fluid line; and wireless remote control means for selectively turning said pump on or off from a location outside of said building.

2. The apparatus of claim 1 wherein said wireless remote control means operates on radio frequencies.

3. The apparatus of claim 1 comprising means for operably introducing a second chemical into said fluid conduit.

4. The apparatus of claim 1 wherein said water line includes a cold water line and a hot water line and connection means for selectively connecting or disconnecting said hot water line from the pump inlet.

5. The apparatus of claim 1 comprising a pressure relief valve in said fluid conduit for releasing fluid when pressure within said fluid conduit exceeds a predetermined amount, said relief valve having an inlet and an outlet.

6. The apparatus of claim 5 wherein said pressure relief valve outlet is fluidly connected upstream of said pump inlet through a relief conduit.

7. The apparatus of claim 6 including means in said relief conduit for turning off the pump when the fluid temperature in the relief conduit exceeds a predetermined level.

8. The apparatus of claim 1 wherein said valve includes means for preventing said valve from freezing due to outside temperatures.

9. A freeze-proof valve comprising:

a valve body having an inlet port and an outlet port;

a valve seat in said valve body in fluid communication with said valve inlet port;

a valve head disposed in said valve body and having a closed position in sealing contact with said valve seat and an open position spaced from said valve seat;

a fluid passageway associated with said valve body for connecting said valve inlet port to said outlet port when said valve head is in said open position;

means for biasing said valve head to said closed position thereof;

handle means on the outside of the building for selectively overcoming the biasing means to move the valve head to said open position thereof; and pressure means associated with said valve head for causing said valve head to remain in said open position in response to a buildup of pressure upstream of said valve head.

10. Apparatus comprising:

an enclosed building having outside walls;

a water line disposed in said building for supplying water at a pressure in a first pressure range;

a pump having an inlet operably attached to said water line and an outlet for delivering water at a pressure higher than that of the pressure of said first pressure range;

a valve comprising:
an inlet port and an outlet port;
a valve body;
a valve seat in said valve body in fluid communication with said valve inlet port;
a valve head disposed in said valve body having a closed position in sealing contact with said valve seat and an open position spaced from said valve seat;
a fluid passageway associated with said valve body for connecting said valve inlet port to said outlet port when said valve head is in said open position;
means for biasing said valve head to said closed position thereof;

handle means on the outside of the building for selectively overcoming the biasing means to move the valve head to said open position thereof; and pressure means associated with said valve head for causing said valve head to remain in said open position in response to a buildup of pressure upstream of said valve head due to the operation of said pump in association with the restriction of flow by said nozzle;

a fluid conduit operably attached at one end thereof to said pump outlet and at the other end thereof to the inlet port of said valve;

a spray wand, including an outlet nozzle;

means for selectively, operatively connecting or disconnecting said spray wand to said outlet port of the valve;

means for operably introducing a cleaning chemical into the fluid passing through said fluid conduit; and wireless remote control means for selectively turning said pump on or off from a location remote from said pump.

11. The apparatus of claim 10 comprising means for selectively connecting or disconnecting said spray wand to said valve outlet.

\* \* \* \* \*